United States Patent
Takeyama et al.

(10) Patent No.: US 12,234,556 B2
(45) Date of Patent: Feb. 25, 2025

(54) COLD ROLLED STEEL SHEET FOR ZIRCONIUM-BASED CHEMICAL CONVERSION TREATMENT, METHOD FOR PRODUCING SAME, ZIRCONIUM-BASED CHEMICAL CONVERSION-TREATED STEEL SHEET, AND METHOD FOR PRODUCING SAME

(71) Applicant: JFE STEEL CORPORATION, Tokyo (JP)

(72) Inventors: Hayato Takeyama, Tokyo (JP); Takeshi Matsuda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 501 days.

(21) Appl. No.: 17/292,076

(22) PCT Filed: Oct. 23, 2019

(86) PCT No.: PCT/JP2019/041551
§ 371 (c)(1),
(2) Date: May 7, 2021

(87) PCT Pub. No.: WO2020/095682
PCT Pub. Date: May 14, 2020

(65) Prior Publication Data
US 2021/0395895 A1    Dec. 23, 2021

(30) Foreign Application Priority Data

Nov. 9, 2018  (JP) .................... 2018-211721

(51) Int. Cl.
C23C 22/78 (2006.01)
C21D 6/00 (2006.01)
(Continued)

(52) U.S. Cl.
CPC .............. *C23C 22/78* (2013.01); *C21D 6/002* (2013.01); *C21D 6/005* (2013.01); *C21D 6/008* (2013.01);
(Continued)

(58) Field of Classification Search
None
See application file for complete search history.

(56) References Cited

U.S. PATENT DOCUMENTS 8,535,456 B2   9/2013   Ishii et al.
8,986,468 B2   3/2015   Miura et al.
(Continued)

FOREIGN PATENT DOCUMENTS

CN   102089459 A   6/2011
CN   102575357 A   7/2012
(Continued)

OTHER PUBLICATIONS

Translation—JP-2017145471-A; Date H et al; Aug. 24, 2017 (Year: 2017).*

(Continued)

*Primary Examiner* — Humera N. Sheikh
*Assistant Examiner* — Elizabeth D Ivey
(74) *Attorney, Agent, or Firm* — KENJA IP LAW PC

(57) ABSTRACT

Provided is a low-cost cold rolled steel sheet for zirconium-based chemical conversion treatment that contains Si and Mn and has excellent zirconium-based chemical convertibility even when a relatively large amount of Si-based oxide and Si—Mn-based oxide exists on the steel sheet surface. A cold rolled steel sheet for zirconium-based chemical conversion treatment comprises a chemical composition containing, in mass %, C: 0.05% to 0.30%, Si: 0.01% to 1.4%, Mn: 0.14% to 3.2%, P: 0.10% or less, and S: 0.01% or less, with a balance consisting of Fe and inevitable impurities, (Continued)

wherein a Si/Mn mass ratio in steel is 0.10 to 0.7, and a surface coating ratio of steel sheet surface layer oxides having Si content of 10 mass % or more is 40% or less.

18 Claims, 3 Drawing Sheets

(51) Int. Cl.
  *C21D 9/46*   (2006.01)
  *C22C 38/00*  (2006.01)
  *C22C 38/02*  (2006.01)
  *C22C 38/06*  (2006.01)
  *C22C 38/20*  (2006.01)
  *C22C 38/22*  (2006.01)
  *C22C 38/26*  (2006.01)
  *C22C 38/28*  (2006.01)
  *C22C 38/32*  (2006.01)
  *C22C 38/38*  (2006.01)
  *C23C 22/34*  (2006.01)

(52) U.S. Cl.
  CPC .............. *C21D 9/46* (2013.01); *C22C 38/001* (2013.01); *C22C 38/002* (2013.01); *C22C 38/02* (2013.01); *C22C 38/06* (2013.01); *C22C 38/20* (2013.01); *C22C 38/22* (2013.01); *C22C 38/26* (2013.01); *C22C 38/28* (2013.01); *C22C 38/32* (2013.01); *C22C 38/38* (2013.01); *C23C 22/34* (2013.01)

(56) References Cited

U.S. PATENT DOCUMENTS

| | | | |
|---|---|---|---|
| 9,090,952 | B2 | 7/2015 | Makimizu et al. |
| 9,879,346 | B2 | 1/2018 | Kodama et al. |
| 2005/0139293 | A1* | 6/2005 | Nomura ................. C23C 30/00 148/320 |
| 2009/0053096 | A1* | 2/2009 | Miura ..................... C22C 38/04 148/320 |
| 2011/0100830 | A1 | 5/2011 | Ishii et al. |
| 2013/0149526 | A1 | 6/2013 | Masuoka et al. |
| 2018/0037969 | A1 | 2/2018 | Yoshioka et al. |

FOREIGN PATENT DOCUMENTS

| | | | |
|---|---|---|---|
| CN | 102666923 | A | 9/2012 |
| CN | 103290309 | A | 9/2013 |
| CN | 107429344 | A | 12/2017 |
| EP | 2309026 | A1 | 4/2011 |
| JP | H04276060 | A | 10/1992 |
| JP | 2003155578 | A | 5/2003 |
| JP | 2003226920 | A | 8/2003 |
| JP | 2005290440 | A | 10/2005 |
| JP | 2012132092 | A | 7/2012 |
| JP | 2015098620 | A | 5/2015 |
| JP | 2017145471 | A * | 8/2017 |
| JP | 6210175 | B2 | 10/2017 |
| KR | 1020070107179 | A | 11/2007 |
| KR | 1020110018421 | A | 2/2011 |
| WO | 2006109489 | A1 | 10/2006 |
| WO | 2010004651 | A1 | 1/2010 |

OTHER PUBLICATIONS

Oct. 13, 2022, Office Action issued by the Korean Intellectual Property Office in the corresponding Korean Patent Application No. 10-2021-7013659 with English language concise statement of relevance.

Dec. 2, 2021, Office Action issued by the China National Intellectual Property Administration in the corresponding Chinese Patent Application No. 201980073366.2 with English language search report.

Nov. 29, 2021, the Extended European Search Report issued by the European Patent Office in the corresponding European Patent Application No. 19881139.0.

Apr. 6, 2021, Notification of Reasons for Refusal issued by the Japan Patent Office in the corresponding Japanese Patent Application No. 2020-512629 with English language Concise Statement of Relevance.

Dr. Masahiro Nomura et al., Development of High Strength Cold-rolled Steel Sheets with Excellent Phosphatability, Kobe Steel Engineering Reports, Aug. 2007, pp. 74-77, vol. 57, No. 2 with a partial English translation.

Jan. 28, 2020, International Search Report issued in the International Patent Application No. PCT/JP2019/041551.

* cited by examiner

SEM image

EDS(O)

EDS(Si)

EDS(Mn)

EDS(Fe)

0   100

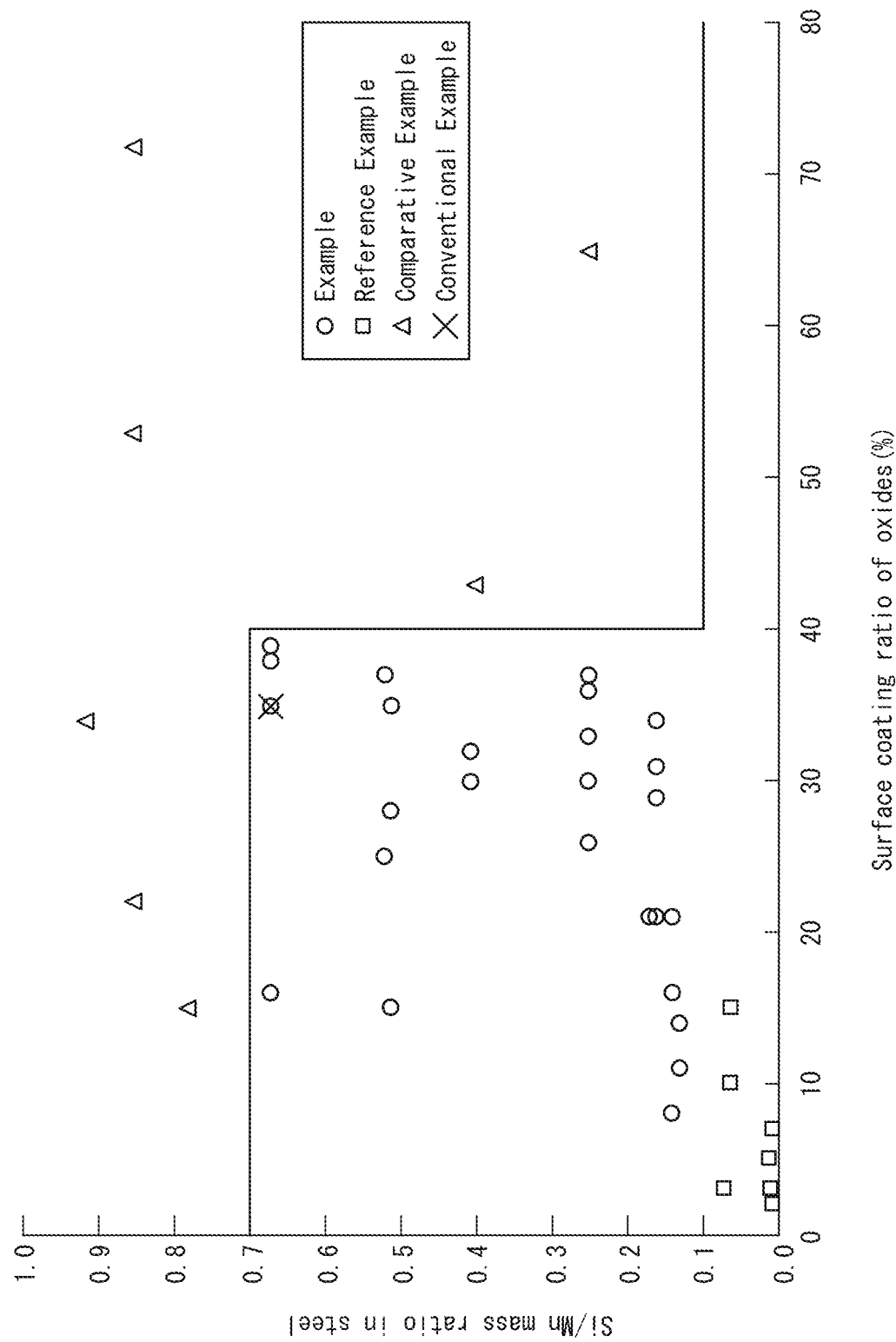

COLD ROLLED STEEL SHEET FOR ZIRCONIUM-BASED CHEMICAL CONVERSION TREATMENT, METHOD FOR PRODUCING SAME, ZIRCONIUM-BASED CHEMICAL CONVERSION-TREATED STEEL SHEET, AND METHOD FOR PRODUCING SAME

TECHNICAL FIELD

The present disclosure relates to a cold rolled steel sheet for zirconium-based chemical conversion treatment that contains Si and Mn and is suitable for use in automotive members and the like, and a method for producing the same.

The present disclosure also relates to a zirconium-based chemical conversion-treated steel sheet including the cold rolled steel sheet for zirconium-based chemical conversion treatment as a base steel sheet, and a method for producing the same. The present disclosure is particularly intended to improve post-coating corrosion resistance and painting layer adhesion.

BACKGROUND

To improve corrosion resistance and painting layer adhesion in automotive bodies, cold rolled steel sheets as material are conventionally subjected to chemical conversion treatment using phosphate (hereafter also referred to as "phosphate-based chemical conversion treatment").

However, in the case where high-strength cold rolled steel sheets are used as the cold rolled steel sheets, phosphate-based chemical convertibility degrades due to formation of steel sheet surface layer oxides.

In view of this, for example, JP 2005-290440 A (PTL 1) discloses a method of improving phosphate-based chemical convertibility by limiting the Si/Mn mass ratio in steel to 0.4 or less.

JP 2012-132092 A (PTL 2) discloses a method of improving phosphate-based chemical convertibility by performing strong pickling after annealing to remove steel sheet surface layer oxides.

JP 6210175 B2 (PTL 3) discloses a high-strength cold rolled steel sheet with phosphate-based chemical convertibility improved by limiting the steel sheet surface coating ratio of Si-based oxide to 1% or less.

JP 2003-155578 A (PTL 4) discloses use of zirconium-based chemical conversion treatment instead of phosphate-based chemical conversion treatment in order to reduce environmental burden and suppress sludge mainly made of iron phosphate and the like.

CITATION LIST

Patent Literatures

PTL 1: JP 2005-290440 A
PTL 2: JP 2012-132092 A
PTL 3: JP 6210175 B2
PTL 4: JP 2003-155578 A

SUMMARY

Technical Problem

In recent years, zirconium-based chemical conversion treatment has become increasingly common due to reasons such as the need to reduce environmental burden and the increased use of aluminum alloys in automotive bodies.

However, when the steel sheet described in each of PTL 1 and PTL 3 is subjected to zirconium-based chemical conversion treatment, zirconium-based chemical convertibility is poor in the case where there is a large amount of Si—Mn-based oxide on the steel sheet surface.

The method described in PTL 2 requires pickling to be performed a plurality of times. This increases the number of steps, and may result in a cost increase.

PTL 4 has no mention of conditions for a base steel sheet that can achieve favorable chemical convertibility.

It could therefore be helpful to provide a low-cost cold rolled steel sheet for zirconium-based chemical conversion treatment that contains Si and Mn and has excellent zirconium-based chemical convertibility even when a relatively large amount of Si-based oxide and Si—Mn-based oxide exists on the steel sheet surface, together with a method for producing the same.

It could also be helpful to provide a zirconium-based chemical conversion-treated steel sheet including the cold rolled steel sheet for zirconium-based chemical conversion treatment as a base steel sheet, together with a method for producing the same.

Solution to Problem

Phosphate-based chemical conversion treatment causes relatively high environmental burden due to heavy metals contained in a zinc phosphate chemical conversion treatment liquid and the formation of sludge mainly made of iron phosphate. Zirconium-based chemical conversion treatment, on the other hand, can reduce environmental burden because heavy metals are not contained in a treatment liquid and also sludge is reduced. Zirconium-based chemical conversion treatment is also superior because it can be used for aluminum alloys. Zirconium-based chemical conversion treatment is therefore very useful as pre-coating treatment for automotive bodies.

We conducted intensive study to solve the problems stated above and develop a cold rolled steel sheet for zirconium-based chemical conversion treatment having excellent zirconium-based chemical convertibility (post-coating corrosion resistance and painting layer adhesion of a zirconium-based chemical conversion layer).

We consequently discovered the following: In a cold rolled steel sheet for zirconium-based chemical conversion treatment containing Si, Mn, and the like, Si-based and Si—Mn-based oxides form during annealing, as a result of which zirconium-based chemical convertibility degrades. By appropriately adjusting the Si/Mn mass ratio in the steel and the surface coating ratio of steel sheet surface layer oxides, however, a cold rolled steel sheet for zirconium-based chemical conversion treatment having excellent zirconium-based chemical convertibility can be advantageously produced.

We also discovered that, in the production of the cold rolled steel sheet for zirconium-based chemical conversion treatment, it is important to adjust not only the heating temperature (furnace temperature) but also the dew point of the furnace atmosphere in the annealing.

The present disclosure is based on these discoveries.
We thus provide:
1. A cold rolled steel sheet for zirconium-based chemical conversion treatment, comprising a chemical composition containing (consisting of), in mass %, C: 0.05% to 0.30%, Si: 0.01% to 1.4%, Mn: 0.14% to 3.2%, P: 0.10% or less, and S: 0.01% or less, with a balance consisting of Fe and inevitable impurities, wherein a Si/Mn mass ratio in steel is 0.10 to 0.7, and a surface coating ratio of steel sheet surface layer oxides having Si content of 10 mass % or more is 40% or less.

2. The cold rolled steel sheet for zirconium-based chemical conversion treatment according to 1., wherein the chemical composition further contains, in mass %, one or more selected from the group consisting of Al: 0.001% to 1.000%, B: 0.005% or less, Nb: 0.005% to 0.050%, Ti: 0.005% to 0.080%, Cr: 0.001% to 1.000%, Mo: 0.05% to 1.00%, Cu: 0.01% to 1.00%, Ni: 0.05% to 1.00%, Sb: 0.001% to 0.200%, and N: 0.010% or less.

3. The cold rolled steel sheet for zirconium-based chemical conversion treatment according to 1. or 2., wherein the Si/Mn mass ratio is more than 0.4 and 0.7 or less.

4. The cold rolled steel sheet for zirconium-based chemical conversion treatment according to any one of 1. to 3., wherein the surface coating ratio of the steel sheet surface layer oxides is 30% or less.

5. A zirconium-based chemical conversion-treated steel sheet, comprising: the cold rolled steel sheet for zirconium-based chemical conversion treatment according to any one of 1. to 4.; and a zirconium-based chemical conversion layer on a surface of the cold rolled steel sheet for zirconium-based chemical conversion treatment.

6. A method for producing a cold rolled steel sheet for zirconium-based chemical conversion treatment, comprising annealing a cold rolled steel sheet by performing heating treatment under conditions that a dew point of a furnace atmosphere is −25° C. or less and a furnace temperature is 750° C. to 900° C., the cold rolled steel sheet having a chemical composition containing, in mass %, C: 0.05% to 0.30%, Si: 0.01% to 1.4%, Mn: 1.5% to 3.2%, P: 0.10% or less, and S: 0.01% or less, with a balance consisting of Fe and inevitable impurities, and having a Si/Mn mass ratio in steel of 0.10 to 0.7.

7. The method for producing a cold rolled steel sheet for zirconium-based chemical conversion treatment according to 6., wherein the chemical composition further contains, in mass %, one or more selected from the group consisting of Al: 0.001% to 1.000%, B: 0.005% or less, Nb: 0.005% to 0.050%, Ti: 0.005% to 0.080%, Cr: 0.001% to 1.000%, Mo: 0.05% to 1.00%, Cu: 0.01% to 1.0%, Ni: 0.05% to 1.00%, Sb: 0.001% to 0.20%, and N: 0.010% or less.

8. The method for producing a cold rolled steel sheet for zirconium-based chemical conversion treatment according to 6. or 7., comprising subjecting the cold rolled steel sheet after the annealing to temper rolling a plurality of times, without pickling.

9. A method for producing a zirconium-based chemical conversion-treated steel sheet, comprising subjecting a cold rolled steel sheet for zirconium-based chemical conversion treatment obtained by the method according to any one of 6. to 8., to chemical conversion treatment using a zirconium-based chemical conversion treatment liquid.

10. The method for producing a zirconium-based chemical conversion-treated steel sheet according to 9., wherein the zirconium-based chemical conversion treatment liquid contains hexafluorozirconic acid and aluminum nitrate.

11. The method for producing a zirconium-based chemical conversion-treated steel sheet according to 10., wherein the zirconium-based chemical conversion treatment liquid is an acid aqueous solution that contains 50 mass ppm to 500 mass ppm of the hexafluorozirconic acid in terms of Zr and has a pH of 3 to 5.

12. The method for producing a zirconium-based chemical conversion-treated steel sheet according to 10., wherein the zirconium-based chemical conversion treatment liquid contains 50 mass ppm to 500 mass ppm of the hexafluorozirconic acid in terms of Zr, 5 mass ppm to 50 mass ppm of free fluorine, and 30 mass ppm to 300 mass ppm of the aluminum nitrate in terms of Al.

Advantageous Effect

It is thus possible to provide a low-cost cold rolled steel sheet for zirconium-based chemical conversion treatment that contains Si and Mn and has excellent zirconium-based chemical convertibility even when a relatively large amount of Si-based oxide and Si—Mn-based oxide exists on the steel sheet surface, together with a method for producing the same.

BRIEF DESCRIPTION OF THE DRAWINGS

In the accompanying drawings:

FIG. 3 is a diagram illustrating the correspondence between FIG. 1 and examples.

DETAILED DESCRIPTION

Figure 1:
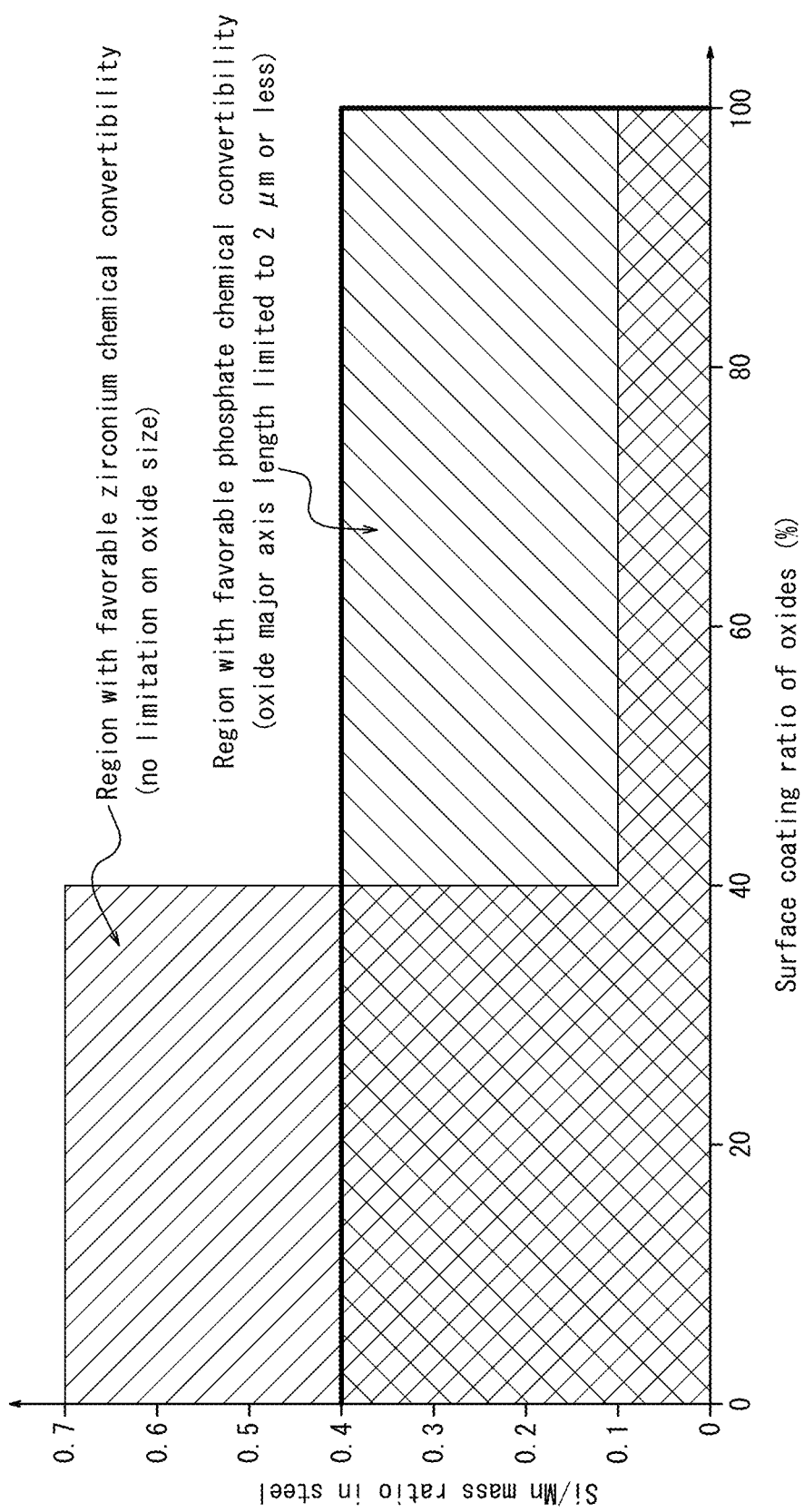
FIG. 1 is a diagram illustrating the results of investigating the relationship between the Si/Mn mass ratio in steel and the surface coating ratio of steel sheet surface layer oxides with which favorable painting layer adhesion is achieved, in zirconium-based chemical conversion treatment and zinc phosphate chemical conversion treatment.

A basic technical idea of the present disclosure will be described below.

To recrystallize a cold rolled steel sheet after cold rolling to form desired microstructure and impart excellent strength and workability to the cold rolled steel sheet, the cold rolled steel sheet after cold rolling is typically subjected to annealing using a continuous annealing furnace. In the annealing, non-oxidizing or reducing gas is usually used as atmosphere gas, and the dew point of the atmosphere gas is strictly managed. Hence, in a typical cold rolled steel sheet in which the content of alloying elements is low, the steel sheet surface is prevented from oxidation.

In a steel sheet that contains Mn, Al, or Si which is an element more easily oxidizable than Fe, however, even when the composition and the dew point of the atmosphere gas in the annealing are strictly managed, the element more easily oxidizable than Fe is selectively oxidized, and oxide containing the easily oxidizable element inevitably forms on the steel sheet surface.

The oxide containing the easily oxidizable element forms on the steel sheet surface. Accordingly, phosphate-based chemical conversion treatment conventionally used as pretreatment for a base steel sheet in electrodeposition coating may degrade the etching property of the steel sheet surface. There is thus a possibility that a sound phosphate-based chemical conversion layer is not formed and the painting layer adhesion degrades significantly.

While there are various findings on phosphate-based chemical conversion treatment, findings on zirconium-based chemical conversion treatment are not many. We accordingly conducted various studies to obtain a high-strength cold rolled steel sheet having excellent zirconium-based chemical convertibility.

We consequently discovered that zirconium-based chemical conversion treatment has a different reaction mechanism from phosphate-based chemical conversion treatment, and thus the optimal surface state of the base steel sheet subjected to chemical conversion treatment is different between zirconium-based chemical conversion treatment and phosphate-based chemical conversion treatment.

It is conventionally considered that favorable phosphate-based chemical conversion treatment is difficult in the case where the Si/Mn mass ratio in the steel is relatively high. Regarding zirconium-based chemical conversion treatment, on the other hand, even in the case where the Si/Mn mass ratio in the steel is relatively high, favorable zirconium-based chemical convertibility can be achieved by appropriately controlling the coating ratio of steel sheet surface layer oxides. That is, we overcame the conventional technical prejudice that the Si/Mn mass ratio in the steel of the base steel sheet needs to be low for favorable chemical conversion treatment, and discovered that, for zirconium-based chemical conversion treatment, favorable chemical convertibility can be achieved even in the case where the Si/Mn mass ratio in the steel of the base steel sheet is relatively high.

Moreover, we overcame the conventional technical prejudice that the dew point of the furnace atmosphere during annealing when producing the base steel sheet needs to be strictly limited for favorable chemical conversion treatment, and discovered that, for zirconium-based chemical conversion treatment, a cold rolled steel sheet for zirconium-based chemical conversion treatment having favorable chemical convertibility can be produced even in the case where the dew point of the furnace atmosphere during annealing is relatively high.

The present disclosure is based on these discoveries.

According to the present disclosure, by limiting, to a predetermined range, the surface coating ratio of Si-based and Si—Mn-based oxides formed on the surface of a steel sheet whose Si/Mn mass ratio in steel is adjusted to an appropriate range, the reaction area of the steel sheet surface that can react in chemical conversion treatment can be increased to thus improve zirconium-based chemical convertibility. An automotive body produced using such a zirconium-based chemical conversion-treated steel sheet has excellent post-coating corrosion resistance and painting layer adhesion.

Moreover, according to the present disclosure, the annealing conditions for producing a cold rolled steel sheet for zirconium-based chemical conversion treatment can be considerably relaxed as compared with the production conditions for a conventionally known cold rolled steel sheet for phosphate-based chemical conversion treatment. Hence, the annealing conditions that can balance the material property (strength and workability) and the coating property (zirconium-based chemical convertibility) can be widened. Further, a cold rolled steel sheet for zirconium-based chemical conversion treatment having excellent chemical convertibility can be produced without pickling the cold rolled steel sheet after annealing a plurality of times. A low-cost cold rolled steel sheet for zirconium-based chemical conversion treatment can thus be provided.

Moreover, according to the present disclosure, there is no need to, for example, set the dew point of the furnace to be extremely low by dehumidification or the like, with it being possible to reduce the production costs.

Herein, the term "zirconium-based chemical conversion treatment" denotes chemical conversion treatment using a chemical conversion treatment liquid containing zirconium ions, and the details of the treatment are not particularly limited.

The reasons for limiting the chemical composition in a cold rolled steel sheet for zirconium-based chemical conversion treatment and a zirconium-based chemical conversion-treated steel sheet according to the present disclosure will be described below. Herein, "%" with regard to each component denotes mass % unless otherwise noted. Moreover, each numeric range expressed in the form of "A to B" denotes a range including the values "A" and "B" as a lower limit and an upper limit.

C: 0.05% to 0.30%

C is an element effective in adjusting the strength of the steel. If the C content is 0.05% or more and 0.30% or less, weldability does not decrease. The C content is therefore in a range of 0.05% to 0.30%. The C content is preferably 0.20% or less. The C content is preferably 0.08% or more.

Si: 0.01% to 1.4%

Si is an element effective in strengthening the steel and improving ductility, but concentrates at the steel sheet surface and forms Si-based oxide in continuous annealing. This Si-based oxide is hardly soluble in a zirconium-based chemical conversion treatment liquid, and thus hampers zirconium-based chemical convertibility. The Si content is therefore limited to 1.4% or less. The Si content is more preferably 1.0% or less. From the viewpoint of reducing the steelmaking process costs, the Si content is 0.01% or more. The Si content is preferably 0.1% or more. The Si content is preferably 0.7% or less.

Mn: 0.14% to 3.2%

Mn is an element necessary to ensure strength, and also necessary to suppress the formation of Si-based oxide and form Si—Mn-based oxide. To achieve these effects, the Mn content is 0.14% or more, and preferably 1.5% or more. If the Mn content is excessively high, both ductility and weldability degrade. The Mn content is therefore limited to 3.2% or less. The Mn content is preferably 3.0% or less. The Mn content is preferably 1.0 or more.

P: 0.10% or Less

P is an element that is contained inevitably. Although no lower limit is placed on the P content, the P content is preferably 0.005% or more in order to prevent a cost increase. Slab productivity decreases with an increase in P content. To prevent this, the P content needs to be 0.10% or less. The P content is therefore 0.10% or less. The P content is preferably 0.05% or less.

S: 0.01% or Less

S is an element that is contained inevitably in steelmaking. If the S content is high, weldability degrade. The S content is therefore 0.01% or less. The S content is preferably 0.005% or less. Although no lower limit is placed on the S content, the S content is preferably 0.001% or more from the viewpoint of the constraints in production technology.

The balance of the chemical composition consists of Fe and inevitable impurities.

While the essential components have been described above, the chemical composition may optionally contain the following elements.

Al: 0.001% to 1.000%

Al is added to deoxidize molten steel. If the Al content is less than 0.001%, the effect is insufficient. If the Al content is more than 1.000%, a cost increase is incurred. The Al content is therefore 0.001% or more and 1.000% or less. The Al content is preferably 0.002% or more. The Al content is preferably 0.05% or less.

B: 0.005% or Less

B has a quenching accelerating effect when added in a very small amount. If the B content is more than 0.005%, deep drawability degrades. Accordingly, in the case of containing B, the B content is 0.005% or less. Although no lower limit is placed on the B content, the B content is preferably 0.0005% or more from the viewpoint of the constraints in production technology.

N: 0.010% or Less

In the case of containing N, the N content is 0.010% or less. Although no lower limit is placed on the N content, the N content is preferably 0.005% or more from the viewpoint of the constraints in production technology.

Nb: 0.005% to 0.050%

Nb has a strength adjusting (strength improving) effect when the Nb content is 0.005% or more. If the Nb content is more than 0.050%, a cost increase is incurred. Accordingly, in the case of containing Nb, the Nb content is 0.005% or more and 0.050% or less. The Nb content is preferably 0.01% or more. The Nb content is preferably 0.03% or less.

Ti: 0.005% to 0.080%

Ti has a strength adjusting (strength improving) effect when the Ti content is 0.005% or more. If the Ti content is excessively high, ductility tends to decrease. Accordingly, in the case of containing Ti, the Ti content is 0.005% or more and 0.080% or less. The Ti content is preferably 0.01% or more. The Ti content is preferably 0.03% or less.

Cr: 0.001% to 1.000%

Cr has a hardenability improving effect when the Cr content is 0.001% or more. If the Cr content is more than 1.000%, weldability degrades. Accordingly, in the case of containing Cr, the Cr content is 0.001% or more and 1.000% or less. The Cr content is preferably 0.01% or more. The Cr content is preferably 0.05% or less.

Mo: 0.05% to 1.00%

Mo has a strength adjusting (strength improving) effect when the Mo content is 0.05% or more. If the Mo content is more than 1.00%, a cost increase is incurred. Accordingly, in the case of containing Mo, the Mo content is 0.05% or more and 1.00% or less. The Mo content is preferably 0.1% or more. The Mo content is preferably 0.5% or less.

Cu: 0.01% to 1.00%

Cu accelerates the formation of retained y phase and effectively contributes to improved strength when the Cu content is 0.01% or more. If the Cu content is more than 1.00%, a cost increase is incurred. Accordingly, in the case of containing Cu, the Cu content is 0.01% or more and 1.00% or less. The Cu content is preferably 0.05% or more. The Cu content is preferably 0.08% or less.

Ni: 0.05% to 1.00%

Ni contributes to improved strength by its retained y phase formation accelerating effect when the Ni content is 0.05% or more, as with Cu. If the Ni content is more than 1.00%, a cost increase is incurred. Accordingly, in the case of containing Ni, the Ni content is 0.05% or more and 1.00% or less.

Sb: 0.001% to 0.200%

Sb may be contained from the viewpoint of suppressing nitriding and oxidation of the steel sheet surface and further suppressing decarburization in a region of several tens of microns in the thickness direction from the steel sheet surface caused by oxidation. By suppressing nitriding and oxidation of the steel sheet surface, the decrease of the amount of martensite formed on the steel sheet surface can be prevented, and fatigue resistance and surface quality can be improved. These effects are achieved if the Sb content is 0.001% or more. If the Sb content is more than 0.200%, toughness degrades. Accordingly, in the case of containing Sb, the Sb content is 0.001% or more and 0.200% or less. The Sb content is preferably 0.005% or more. The Sb content is preferably 0.100% or less.

In the present disclosure, in addition to adjusting the chemical composition of the steel sheet to the above-described appropriate range, the Si/Mn mass ratio in the steel needs to be adjusted to a range of 0.10 to 0.7.

FIG. 1 is a diagram illustrating the results of investigating the relationship between the Si/Mn mass ratio in steel and the surface coating ratio of steel sheet surface layer oxides with which favorable painting layer adhesion is achieved, in zirconium-based chemical conversion treatment and zinc phosphate chemical conversion treatment. The test was conducted in the same way as the below-described examples. FIG. 3 illustrates the correspondence between FIG. 1 and the examples. As in the examples, oxides having Si content of 10 mass % or more in element mapping (hereafter also referred to as "EDS mapping") using an energy dispersive X-ray spectrometer (EDS) were taken to be the steel sheet surface layer oxides. In the case of zirconium-based chemical conversion treatment, the size of the steel sheet surface layer oxides was not limited. In the case of zinc phosphate chemical conversion treatment, the size of the steel sheet surface layer oxides was limited to 2 µm or less in major axis length.

Phosphate chemical convertibility is evaluated as good if the Si/Mn mass ratio in the steel is 0.4 or less, with reference to the findings described in PTL 1. In the case where the Si/Mn mass ratio in the steel is less than 0.10, Si-based oxide hardly forms and granular Mn-based oxide forms on the steel sheet surface after annealing, as described later. It is considered that granular Mn-based oxide does not adversely affect chemical convertibility even when its surface coating ratio is high. Hence, in the case where the Si/Mn mass ratio in the steel is less than 0.10, zirconium-based chemical convertibility is evaluated as good even in the region where the surface coating ratio of oxides is 40% or more in FIG. 2, in order to indicate that zirconium-based chemical convertibility is good even though the surface coating ratio of oxides including Mn-based oxide is high.

As summarized in the drawing, in zinc phosphate chemical conversion treatment (where the size of the steel sheet surface layer oxides is 2 µm or less in major axis length), if the Si/Mn mass ratio in the steel is 0.4 or less, favorable painting layer adhesion is achieved regardless of the surface coating ratio of steel sheet surface layer oxides.

In zirconium-based chemical conversion treatment, on the other hand, if the surface coating ratio of the steel sheet surface layer oxides is 40% or less, favorable painting layer adhesion is achieved over the wide range of the Si/Mn mass ratio in the steel of 0.10 to 0.7, i.e. even when the Si/Mn mass ratio is more than 0.4 which is the range where favorable painting layer adhesion cannot be expected in zinc phosphate chemical conversion treatment.

Accordingly, in the present disclosure, the Si/Mn mass ratio in the steel is limited to a range of 0.10 to 0.7, and the surface coating ratio of the steel sheet surface layer oxides having Si content of 10 mass % or more is limited to 40% or less. The surface coating ratio of the steel sheet surface layer oxides having Si content of 10 mass % or more is preferably 30% or less, more preferably 20% or less, and further preferably 10% or less. The Si/Mn mass ratio in the steel may be 0.2 or more, and may be more than 0.4.

Herein, the term "steel sheet surface layer oxides" denotes Si-based oxide and Si—Mn-based oxide, and examples of main compositions are $SiO_2$ and $Mn_2SiO_4$.

Herein, the term "Si-based oxide" denotes oxide that forms in the steel sheet surface layer mainly when the Si/Mn mass ratio in the steel is more than 0.4, and the term "Si—Mn-based oxide" denotes oxide that forms in the steel sheet surface layer mainly when the Si/Mn mass ratio in the steel is 0.10 or more and 0.4 or less. These oxides both degrade zirconium-based chemical convertibility.

The reason for targeting the steel sheet surface layer oxides having Si content of 10 mass % or more in the EDS mapping is as follows: In the case where the Si/Mn mass ratio in the steel is 0.10 or more, the boundary between the steel sheet surface layer oxides and the base steel in an image (SEM image) observed by a scanning electron microscope (SEM) corresponds to "Si content: 10 mass %" in the EDS mapping.

The steel sheet surface layer oxides having Si content of 10 mass % or more are determined as follows:

EDS mapping is performed for various observation fields on the steel sheet surface. In the observation fields, a part with the highest Si strength is defined as "Si content: 100%", and a part with the lowest Si strength is defined as "Si content: 0%". For the other observation fields, the Si content is calculated according to the Si strength ratio, and the coating ratio of the steel sheet surface layer oxides having Si content of 10% or more is determined.

The reason that, in zirconium-based chemical conversion treatment, in the case where the Si/Mn mass ratio in the steel is 0.10 or more, the painting layer adhesion degrades if the coating ratio of the steel sheet surface layer oxides on the steel sheet surface is more than 40% as mentioned above is not clear, but we presume the reason as follows.

In the case where the Si/Mn mass ratio in the steel is less than 0.10, Si-based oxide hardly forms and granular Mn-based oxide forms on the steel sheet surface after annealing, so that chemical convertibility is not particularly affected.

If the Si/Mn mass ratio in the steel is 0.10 or more, however, membranous Si-based oxide or Si—Mn-based oxide forms on the steel sheet surface after annealing. This difference in chemical form of the steel sheet surface layer oxides affects the painting layer adhesion. Particularly when the surface coating ratio of membranous Si-based oxide is high, the painting layer adhesion degrades. In view of this, the coating ratio of Si-based oxide or Si—Mn-based oxide having Si content of 10% or more needs to be 40% or less. In the case where the Si/Mn mass ratio in the steel is 0.10 to 0.4, mainly Si—Mn-based oxide forms. In such a case, zinc phosphate chemical convertibility and zirconium-based chemical convertibility are both good in the region in which the coating ratio of the steel sheet surface layer oxides is 40% or less. In the case where the Si/Mn mass ratio in the steel is more than 0.4, Si-based oxide and Si—Mn-based oxide form. In such a case, only zirconium-based chemical convertibility is good in the region in which the surface coating ratio of the steel sheet surface layer oxides is 40% or less.

In the case where the Si/Mn mass ratio in the steel is more than 0.7, Si-based oxide forms widely, making it difficult to reduce the surface coating ratio of the steel sheet surface layer oxides. Therefore, the Si/Mn mass ratio in the steel needs to be 0.7 or less.

The zirconium-based chemical conversion-treated steel sheet according to the present disclosure includes a zirconium-based chemical conversion layer on the surface of the cold rolled steel sheet for zirconium-based chemical conversion treatment. The zirconium-based chemical conversion layer is obtained by performing zirconium-based chemical conversion treatment on the cold rolled steel sheet for zirconium-based chemical conversion treatment. The zirconium-based chemical conversion treatment will be described in detail later.

A method for producing the cold rolled steel sheet for zirconium-based chemical conversion treatment according to the present disclosure will be described below.

First, a steel material adjusted to a predetermined chemical composition is hot rolled to obtain a hot rolled steel sheet, according to a conventional method. The hot rolled steel sheet is then cold rolled to obtain a cold rolled steel sheet. The cold rolled steel sheet is then annealed typically using a continuous annealing furnace. After this, the cold rolled steel sheet is optionally temper rolled to yield a product.

In the present disclosure, the annealing in the production process is particularly important. In the annealing, heating treatment needs to be performed under the conditions that the dew point of the furnace atmosphere is −25° C. or less and the furnace temperature is 750° C. to 900° C. The treatment time of the heating treatment is not limited, but is typically about 100 sec to 3600 sec.

Here, the dew point of the furnace atmosphere is limited to −25° C. or less because, if the dew point is more than −25° C., the amount of internal oxidation in the annealing increases and the painting layer adhesion degrades.

Moreover, the furnace temperature is limited to 750° C. to 900° C., in order to balance the strength and the workability of the cold rolled steel sheet after the annealing.

In the present disclosure, the chemical composition of the cold rolled steel sheet including the Si/Mn mass ratio in the steel is appropriately adjusted, so that the annealing conditions can be considerably relaxed as compared with the conventional techniques. In detail, the furnace temperature can be set over a wide range of 750° C. to 900° C., and the annealing conditions that can balance the material property (strength and workability) and the coating property (zirconium-based chemical convertibility) can be selected. The dew point of the furnace atmosphere can also be set over a wide range of −25° C. or less, so that the costs required for a dehumidification line, a dehumidification agent, and the like to lower the dew point of the furnace atmosphere can be saved. In conventional chemical conversion treatment, the dew point that can be used as the annealing conditions when producing the base steel sheet is in a narrow range of −40° C. or less.

Furthermore, in the present disclosure, the furnace hydrogen concentration in the annealing can be reduced. In detail, the furnace hydrogen concentration that is conventionally required to be 5 vol % to 10 vol % can be reduced to 2 vol % to 5 vol %.

After the annealing, the cold rolled steel sheet is temper rolled a plurality of times using rolls for temper rolling, to break the steel sheet surface layer oxides. As a result of this temper rolling, the surface coating ratio of the steel sheet surface layer oxides can be further reduced. The number of times the temper rolling is performed is not limited, but is preferably about 2 to 3. The elongation rate of the temper rolling is not limited, but is, for example, about 0.5% to 3.0%. As the method of breaking the steel sheet surface layer oxides, publicly-known blasting, pickling by an acid solution, etc. may be used besides temper rolling. From the viewpoint of reducing the number of steps, the cold rolled steel sheet after the annealing is preferably temper rolled without pickling by an acid solution.

According to the present disclosure, as a result of the furnace hydrogen concentration being reduced, hydrogen entry into the steel during the annealing can be prevented. Consequently, the delayed fracture resistance of the steel sheet can be improved.

A method for producing the zirconium-based chemical conversion-treated steel sheet according to the present disclosure will be described below.

The zirconium-based chemical conversion-treated steel sheet according to the present disclosure can be obtained by performing chemical conversion treatment on the above-described cold rolled steel sheet for zirconium-based chemical conversion treatment using a zirconium-based chemical conversion treatment liquid according to a conventional method.

The zirconium-based chemical conversion treatment is not limited. As an example, the cold rolled steel sheet for zirconium-based chemical conversion treatment is degreased, then washed with water, then subjected to zirconium-based chemical conversion treatment, and then washed with water, to yield a zirconium-based chemical conversion-treated steel sheet.

As the zirconium-based chemical conversion treatment liquid, a commonly used zirconium-based chemical conversion treatment liquid may be used. As an example, a zirconium-based chemical conversion treatment liquid containing hexafluorozirconic acid and aluminum nitrate may be used as the zirconium-based chemical conversion treatment liquid. The zirconium-based chemical conversion treatment liquid may be, for example, an acid aqueous solution with a pH of 3 to 5. The content of the hexafluorozirconic acid is not limited, but may be, for example, 50 mass ppm to 500 mass ppm in terms of Zr. The zirconium-based chemical conversion treatment liquid may contain free fluorine. Herein, the term "free fluorine" denotes fluoride ions that do not form a complex with any of Zr and Al in the zirconium-based chemical conversion treatment liquid. As an example, the zirconium-based chemical conversion treatment liquid contains 50 mass ppm to 500 mass ppm of hexafluorozirconic acid in terms of Zr, 5 mass ppm to 50 mass ppm of free fluorine, and 30 mass ppm to 300 mass ppm of aluminum nitrate in terms of Al.

EXAMPLES

More detailed description will be given below, based on examples. The present disclosure is, however, not limited to these examples. Modifications can be made as appropriate within the range in which the subject matter of the present disclosure is applicable, with such modifications being also included in the technical scope of the present disclosure.

Steels having the chemical compositions listed in Table 1 were each obtained by steelmaking through a typical refining process involving converter treatment, degassing treatment, and the like, and subjected to continuous casting to obtain a steel material (slab). The steel material was then hot rolled to obtain a hot rolled steel sheet. After pickling the hot rolled steel sheet, the hot rolled steel sheet was cold rolled to obtain a cold rolled steel sheet with a thickness of 1.4 mm.

Next, the cold rolled steel sheet was annealed for 120 sec in the range of a dew point of −50° C. to −25° C. and a temperature of 750° C. to 900° C., and then temper rolled at an elongation rate of 0.7% one or more time. Cold rolled steel sheets No. 1 to 32 listed in Table 2 were thus obtained.

Figure 2:
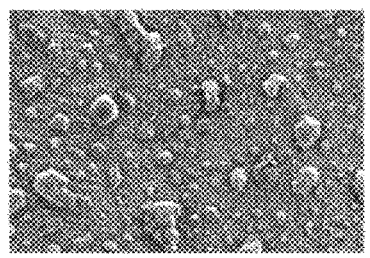
FIG. 2 illustrates microscope photographs of a SEM image and EDS mapping results before zirconium-based chemical conversion treatment in No. 7 in examples.
Figure 2:
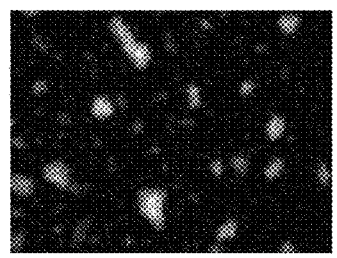
Figure 2:
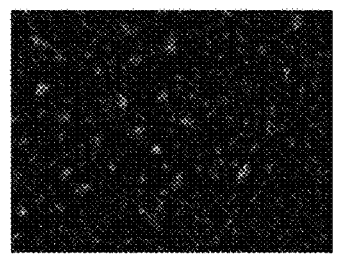
Figure 2:
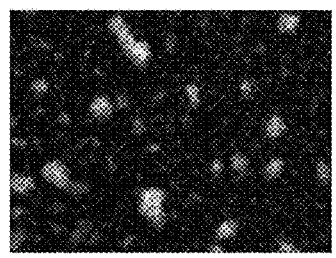
Figure 2:
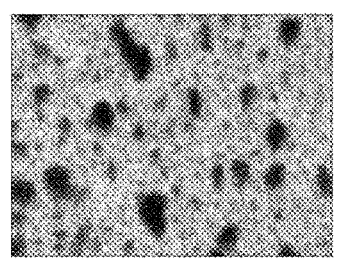
Figure 2:

The surface of each obtained steel sheet was subjected to SEM observation with 30000 magnification and an accelerating voltage of 1 kV, and subjected to EDS mapping with 30000 magnification and an accelerating voltage of 5 kV. Steel sheet surface layer oxides having Si content of 10% or more were defined as Si-based oxide or Si—Mn-based oxide, and the surface coating ratio of the steel sheet surface layer oxides was calculated through image analysis. This was conducted for 10 observation fields on the steel sheet surface, and the average value of the surface coating ratios of the steel sheet surface layer oxides was examined. For reference, FIG. 2 illustrates a SEM image and EDS mapping results (microscope photographs) for the respective elements (O, Si, Mn, Fe) before zirconium-based chemical conversion treatment in No. 7.

In the observation fields, a part with the highest Si strength was defined as "Si mass: 100%", and a part with the lowest Si strength was defined as "Si mass: 0%". The Si content of each steel sheet surface layer oxide was determined according to the strength ratio.

Next, zirconium-based chemical conversion treatment was performed under the following conditions:
(1) Zirconium-based chemical conversion treatment liquid: zirconium-based chemical conversion treatment liquid containing hexafluorozirconic acid and aluminum nitrate (example 1 in JP 5274560 B2).
(2) Chemical conversion treatment process: degreasing→water washing→chemical conversion treatment water→washing.

As a conventional example, zinc phosphate chemical conversion treatment was performed under the following conditions:
(1) Phosphate-based chemical conversion treatment liquid: PALBOND PB-SX35 produced by Nihon Parkerizing Co., Ltd.
(2) Chemical conversion treatment process: degreasing→water washing→surface adjustment→chemical conversion treatment→water washing.

Each of the steel sheets after the zirconium-based chemical conversion treatment and the zinc phosphate chemical conversion treatment was subjected to cathodic electrodeposition coating with a thickness of 20 μm and solvent coating with a thickness 30 μm. The painting layer adhesion was evaluated by the following method, as an index of chemical convertibility. The steel sheet after the coating was immersed in boiling water for 1 hr, and then cross-cut using a utility knife. The center of the cross-cut was extruded 4 mm by an Erichsen tester. Subsequently, tape peeling was performed on the center of the cross-cut, and the area ratio at which the painting layer peeled was measured. The measurement results were evaluated based on the following ratings:

Excellent: less than 10%

Satisfactory: 10% or more and less than 20%

Unsatisfactory: 20% or more and less than 30%

Poor: 30% or more.

The results are listed in Table 2.

TABLE 1

| Steel sample ID | Chemical composition | | | | | | | | |
|---|---|---|---|---|---|---|---|---|---|
| | C (mass %) | Si (mass %) | Mn (mass %) | P (mass %) | S (mass %) | Al (mass %) | Ti (mass %) | Nb (mass %) | B (mass ppm) |
| A | 0.0500 | 0.01 | 2.02 | 0.009 | 0.0033 | 0.032 | 0.021 | 0.024 | 15 |
| B | 0.1370 | 0.02 | 2.45 | 0.009 | 0.0030 | 0.026 | 0.019 | 0.025 | 14 |
| C | 0.0810 | 0.21 | 1.51 | 0.010 | 0.0023 | 0.021 | 0.020 | 0.024 | 19 |
| D | 0.0810 | 0.32 | 2.46 | 0.010 | 0.0023 | 0.022 | 0.020 | 0.024 | 16 |
| E | 0.0910 | 0.20 | 3.20 | 0.010 | 0.0024 | 0.028 | 0.020 | 0.026 | 20 |
| F | 0.1400 | 0.40 | 2.45 | 0.010 | 0.0023 | 0.003 | 0.020 | 0.025 | 15 |
| G | 0.1500 | 0.65 | 2.60 | 0.010 | 0.0023 | 0.003 | 0.020 | 0.025 | 15 |
| H | 0.1400 | 1.40 | 2.10 | 0.010 | 0.0023 | 0.003 | 0.020 | 0.025 | 15 |
| I | 0.1400 | <u>1.70</u> | 2.00 | 0.010 | 0.0023 | 0.003 | 0.020 | 0.025 | 15 |
| J | 0.2070 | <u>0.20</u> | 1.20 | 0.012 | 0.0006 | 0.032 | 0.017 | 0.012 | 7 |
| K | 0.0740 | 0.02 | 2.01 | 0.017 | 0.0023 | 0.046 | — | — | — |
| L | 0.0890 | 0.03 | 2.54 | 0.012 | 0.0018 | 0.042 | 0.022 | 0.026 | 17 |
| M | <u>0.0016</u> | 0.01 | 0.14 | 0.021 | 0.0070 | 0.028 | 0.031 | 0.006 | — |
| N | <u>0.1010</u> | 0.90 | 2.22 | 0.009 | 0.0030 | 0.004 | 0.015 | 0.005 | 16 |
| O | 0.1520 | 1.02 | 2.00 | 0.010 | 0.0025 | 0.010 | 0.014 | 0.021 | 12 |
| P | 0.0920 | 1.40 | 2.70 | 0.009 | 0.0024 | 0.009 | 0.014 | 0.016 | 15 |
| Q | 0.1100 | <u>1.95</u> | 2.50 | 0.020 | 0.0023 | 0.015 | 0.015 | 0.005 | 15 |
| R | 0.0870 | <u>2.10</u> | 2.30 | 0.009 | 0.0025 | 0.010 | 0.014 | 0.006 | 16 |

| Steel sample ID | Chemical composition | | | | | Si/Mn mass ratio | Remarks |
|---|---|---|---|---|---|---|---|
| | N (mass ppm) | Cu (mass %) | Sb (mass %) | Cr (mass %) | Mo (mass %) | | |
| A | 40 | 0.01 | — | 0.012 | — | <u>0.0050</u> | Reference steel |
| B | 35 | 0.01 | — | 0.014 | — | <u>0.0082</u> | Reference steel |
| C | 42 | 0.01 | — | 0.013 | — | 0.1400 | Conforming steel |
| D | 43 | 0.01 | — | 0.012 | — | 0.1300 | Conforming steel |
| E | 37 | 0.01 | — | 0.016 | — | <u>0.0630</u> | Reference steel |
| F | 40 | 0.01 | — | 0.024 | — | 0.1600 | Conforming steel |
| G | 40 | 0.01 | — | 0.014 | — | 0.2500 | Conforming steel |
| H | 40 | 0.01 | — | 0.052 | — | 0.6700 | Conforming steel |
| I | 40 | 0.01 | — | 0.016 | — | <u>0.8500</u> | Comparative steel |
| J | 37 | 0.16 | 0.010 | 0.013 | — | 0.1700 | Conforming steel |
| K | 35 | 0.01 | — | 0.016 | 0.14 | <u>0.0100</u> | Reference steel |
| L | 32 | 0.01 | 0.110 | 0.011 | — | <u>0.0120</u> | Reference steel |
| M | 22 | 0.01 | 0.008 | 0.012 | — | <u>0.0710</u> | Reference steel |
| N | 33 | 0.01 | — | 0.010 | — | 0.4054 | Conforming steel |
| O | 26 | 0.01 | — | 0.011 | — | 0.5100 | Conforming steel |
| P | 36 | 0.01 | — | 0.013 | — | 0.5185 | Conforming steel |
| Q | 40 | 0.01 | — | 0.012 | — | <u>0.7800</u> | Comparative steel |
| R | 33 | 0.01 | — | 0.011 | — | <u>0.9130</u> | Comparative steel |

Underlines indicate outside appropriate range according to present disclosure.

TABLE 2

| Sample No. | Steel sample ID | Dew point (° C.) | Annealing temperature (° C.) | Hydrogen concentration (vol %) | Number of temper rolling operations | Coating ratio of Si-based/Si-Mn-based oxide (%) | Si/Mn mass ratio | Chemical convertibility | Remarks |
|---|---|---|---|---|---|---|---|---|---|
| 1 | A | −25 | 850 | 5 | 2 | 7 | <u>0.0050</u> | Excellent | Reference Example |
| 2 | B | −25 | 850 | 5 | 2 | 3 | <u>0.0082</u> | Excellent | Reference Example |
| 3 | C | −25 | 850 | 5 | 2 | 16 | <u>0.1400</u> | Excellent | Example |
| 4 | D | −25 | 850 | 5 | 2 | 11 | 0.1300 | Excellent | Example |
| 5 | E | −25 | 850 | 5 | 2 | 15 | <u>0.0630</u> | Satisfactory | Reference Example |
| 6 | F | −25 | 850 | 5 | 2 | 29 | <u>0.1600</u> | Excellent | Example |
| 7 | G | −25 | 850 | 5 | 2 | 36 | 0.2500 | Satisfactory | Example |
| 8 | H | −25 | 850 | 5 | 2 | 38 | 0.6700 | Satisfactory | Example |
| 9 | I | −25 | 850 | 5 | 2 | <u>72</u> | <u>0.8500</u> | Poor | Comparative Example |
| 10 | G | −25 | 800 | 5 | 2 | <u>26</u> | 0.2500 | Satisfactory | Example |
| 11 | G | −25 | 900 | 5 | 2 | 33 | 0.2500 | Satisfactory | Example |
| 12 | F | −25 | 750 | 5 | 2 | 34 | 0.1600 | Satisfactory | Example |
| 13 | N | −25 | 850 | 5 | 2 | 32 | 0.4054 | Satisfactory | Example |
| 14 | O | −25 | 850 | 5 | 2 | 35 | 0.5100 | Satisfactory | Example |
| 15 | P | −25 | 850 | 5 | 2 | 37 | 0.5185 | Satisfactory | Example |
| 16 | H | −50 | 850 | 5 | 2 | 39 | 0.6700 | Unsatisfactory | Example |
| 17 | G | −30 | 820 | 2 | 2 | 37 | 0.2500 | Satisfactory | Example |
| 18 | A | −35 | 850 | 5 | 2 | 2 | <u>0.0050</u> | Excellent | Reference Example |
| 19 | B | −35 | 850 | 5 | 2 | 2 | <u>0.0082</u> | Excellent | Reference Example |

TABLE 2-continued

| Sample No. | Steel sample ID | Dew point (° C.) | Annealing temperature (° C.) | Hydrogen concentration (vol %) | Number of temper rolling operations | Coating ratio of Si-based/Si-Mn-based oxide (%) | Si/Mn mass ratio | Chemical convertibility | Remarks |
|---|---|---|---|---|---|---|---|---|---|
| 20 | C | −35 | 850 | 5 | 2 | 8 | 0.1400 | Excellent | Example |
| 21 | C | −35 | 850 | 5 | 1 | 21 | 0.1400 | Excellent | Example |
| 22 | D | −35 | 850 | 5 | 2 | 14 | 0.1300 | Excellent | Example |
| 23 | E | −35 | 850 | 5 | 2 | 10 | _0.0630_ | Satisfactory | Reference Example |
| 24 | F | −35 | 850 | 5 | 2 | 21 | _0.1600_ | Excellent | Example |
| 25 | G | −35 | 850 | 5 | 2 | 30 | 0.2500 | Satisfactory | Example |
| 26 | H | −35 | 850 | 5 | 2 | 35 | 0.6700 | Satisfactory | Example |
| 27 | I | −35 | 850 | 5 | 2 | _53_ | 0.8500 | Poor | Comparative Example |
| 28 | G | −35 | 900 | 5 | 2 | _33_ | _0.2500_ | Satisfactory | Example |
| 29 | F | −35 | 800 | 5 | 2 | 34 | 0.1600 | Satisfactory | Example |
| 30 | G | −35 | 850 | 5 | 1 | _65_ | 0.2500 | Poor | Comparative Example |
| 31 | H | −35 | 850 | 5 | 2 | _35_ | 0.6700 | Poor | Conventional Example |
| 32 | N | −35 | 850 | 5 | 2 | 30 | 0.4054 | Satisfactory | Example |
| 33 | O | −35 | 850 | 5 | 2 | 28 | 0.5100 | Excellent | Example |
| 34 | P | −35 | 850 | 5 | 2 | 25 | 0.5185 | Excellent | Example |
| 35 | J | −30 | 850 | 5 | 2 | 21 | 0.1700 | Satisfactory | Example |
| 36 | K | −30 | 850 | 5 | 2 | 3 | _0.0100_ | Satisfactory | Reference Example |
| 37 | L | −30 | 850 | 5 | 2 | 5 | _0.0120_ | Satisfactory | Reference Example |
| 38 | M | −40 | 850 | 5 | 1 | 3 | _0.0710_ | Satisfactory | Reference Example |
| 39 | F | −40 | 850 | 5 | 2 | 31 | 0.1600 | Satisfactory | Example |
| 40 | N | −35 | 800 | 5 | 1 | _43_ | 0.4000 | Poor | Comparative Example |
| 41 | O | −45 | 850 | 5 | 2 | _15_ | 0.5100 | Satisfactory | Example |
| 42 | H | −45 | 800 | 5 | 2 | 16 | 0.6700 | Satisfactory | Example |
| 43 | Q | −45 | 850 | 5 | 2 | 15 | 0.7800 | Poor | Comparative Example |
| 44 | I | −35 | 800 | 5 | 2 | 22 | _0.8500_ | Poor | Comparative Example |
| 45 | R | −45 | 850 | 5 | 2 | 34 | _0.9130_ | Poor | Comparative Example |
| 46 | K | −30 | 850 | 5 | 1 | 3 | _0.0100_ | Excellent | Reference Example |
| 47 | L | −30 | 850 | 5 | 1 | 5 | _0.0120_ | Excellent | Reference Example |

Underlines indicate outside appropriate range according to present disclosure.

The results in Tables 1 and 2 indicate the following:

In the case where the Si/Mn mass ratio in the steel was 0.1 to 0.7 and the coating ratio of steel sheet surface layer oxides was 40% or less, good zirconium-based chemical convertibility was achieved.

In the case where the coating ratio of steel sheet surface layer oxides was more than 40% as in No. 9, 27, 30, and 40, good zirconium-based chemical convertibility was not achieved.

Although the number of times temper rolling is performed is not limited, the comparison between No. 20 and No. 21 revealed that the coating ratio of steel sheet surface layer oxides greatly decreased in the case where temper rolling was performed a plurality of times.

In the conventional zinc phosphate chemical conversion treatment in No. 31, in the case where the Si/Mn mass ratio in the steel was more than 0.4, good chemical convertibility was not achieved.

While the size of the steel sheet surface layer oxides was approximately in a range of 10 nm to 10 μm, there was no correlation between the size and the zirconium-based chemical convertibility. Moreover, in the case where the Si/Mn mass ratio in the steel was less than 0.1, the chemical convertibility was unaffected, and superior zirconium-based chemical convertibility was achieved (each reference example).

INDUSTRIAL APPLICABILITY

A cold rolled steel sheet for zirconium-based chemical conversion treatment produced according to the present disclosure has excellent zirconium-based chemical convertibility, and is suitable for use not only as material used in automotive body members but also as material required to have similar properties in fields such as home appliances and building members.

The invention claimed is:

1. A cold rolled steel sheet for zirconium-based chemical conversion treatment, comprising
   a chemical composition containing, in mass %,
   C: 0.05% to 0.30%,
   Si: 0.01% to 1.4%,
   Mn: 0.14% to 3.2%,
   P: 0.10% or less, and
   S: 0.01% or less,
   with a balance consisting of Fe and inevitable impurities,
   wherein a Si/Mn mass ratio in steel is more than 0.4 and 0.7 or less, and
   a surface coating ratio of steel sheet surface layer oxides having Si content of 10 mass % or more is 15% or more and 40% or less, where the steel sheet surface layer oxides denote Si-based oxide and Si—Mn-based oxide.

2. The cold rolled steel sheet for zirconium-based chemical conversion treatment according to claim 1, wherein the chemical composition further contains, in mass %, one or more selected from the group consisting of
   Al: 0.001% to 1.000%,
   B: 0.005% or less,
   Nb: 0.005% to 0.050%,
   Ti: 0.005% to 0.080%,
   Cr: 0.001% to 1.000%,
   Mo: 0.05% to 1.00%,
   Cu: 0.01% to 1.00%,
   Ni: 0.05% to 1.00%,
   Sb: 0.001% to 0.200%, and
   N: 0.010% or less.

3. The cold rolled steel sheet for zirconium-based chemical conversion treatment according to claim 1, wherein the surface coating ratio of the steel sheet surface layer oxides is 15% or more and 30% or less.

4. The cold rolled steel sheet for zirconium-based chemical conversion treatment according to claim 2, wherein the surface coating ratio of the steel sheet surface layer oxides is 15% or more and 30% or less.

5. A zirconium-based chemical conversion-treated steel sheet, comprising:
the cold rolled steel sheet for zirconium-based chemical conversion treatment according to claim 1; and
a zirconium-based chemical conversion layer on a surface of the cold rolled steel sheet for zirconium-based chemical conversion treatment.

6. A zirconium-based chemical conversion-treated steel sheet, comprising:
the cold rolled steel sheet for zirconium-based chemical conversion treatment according to claim 2; and
a zirconium-based chemical conversion layer on a surface of the cold rolled steel sheet for zirconium-based chemical conversion treatment.

7. A method for producing a cold rolled steel sheet for zirconium-based chemical conversion treatment, comprising
annealing a cold rolled steel sheet by performing heating treatment under conditions that a dew point of a furnace atmosphere is −25° C. or less and a furnace temperature is 750° C. to 900° C., the cold rolled steel sheet having a chemical composition containing, in mass %,
C: 0.05% to 0.30%,
Si: 0.01% to 1.4%,
Mn: 0.14% to 3.2%,
P: 0.10% or less, and
S: 0.01% or less,
with a balance consisting of Fe and inevitable impurities, and having a Si/Mn mass ratio in steel of more than 0.4 and 0.7 or less, to produce the cold rolled steel sheet for zirconium-based chemical conversion treatment according to claim 1.

8. The method for producing a cold rolled steel sheet for zirconium-based chemical conversion treatment according to claim 7, wherein the chemical composition further contains, in mass %, one or more selected from the group consisting of
Al: 0.001% to 1.000%,
B: 0.005% or less,
Nb: 0.005% to 0.050%,
Ti: 0.005% to 0.080%,
Cr: 0.001% to 1.000%,
Mo: 0.05% to 1.00%,
Cu: 0.01% to 1.00%,
Ni: 0.05% to 1.00%,
Sb: 0.001% to 0.200%, and
N: 0.010% or less, thereby producing the cold rolled steel sheet for zirconium-based chemical conversion treatment according to claim 2.

9. The method for producing a cold rolled steel sheet for zirconium-based chemical conversion treatment according to claim 8, comprising
subjecting the cold rolled steel sheet after the annealing to temper rolling a plurality of times, without pickling.

10. The method for producing a cold rolled steel sheet for zirconium-based chemical conversion treatment according to claim 7, comprising
subjecting the cold rolled steel sheet after the annealing to temper rolling a plurality of times, without pickling.

11. A method for producing a zirconium-based chemical conversion-treated steel sheet, comprising
subjecting the cold rolled steel sheet for zirconium-based chemical conversion treatment according to claim 1, to chemical conversion treatment using a zirconium-based chemical conversion treatment liquid.

12. The method for producing a zirconium-based chemical conversion-treated steel sheet according to claim 11, wherein the zirconium-based chemical conversion treatment liquid contains hexafluorozirconic acid and aluminum nitrate.

13. The method for producing a zirconium-based chemical conversion-treated steel sheet according to claim 12, wherein the zirconium-based chemical conversion treatment liquid is an acid aqueous solution that contains 50 mass ppm to 500 mass ppm of the hexafluorozirconic acid in terms of Zr and has a pH of 3 to 5.

14. The method for producing a zirconium-based chemical conversion-treated steel sheet according to claim 12, wherein the zirconium-based chemical conversion treatment liquid contains 50 mass ppm to 500 mass ppm of the hexafluorozirconic acid in terms of Zr, 5 mass ppm to 50 mass ppm of free fluorine, and 30 mass ppm to 300 mass ppm of the aluminum nitrate in terms of Al.

15. A method for producing a zirconium-based chemical conversion-treated steel sheet, comprising
subjecting the cold rolled steel sheet for zirconium-based chemical conversion treatment according to claim 2, to chemical conversion treatment using a zirconium-based chemical conversion treatment liquid.

16. The method for producing a zirconium-based chemical conversion-treated steel sheet according to claim 15, wherein the zirconium-based chemical conversion treatment liquid contains hexafluorozirconic acid and aluminum nitrate.

17. The method for producing a zirconium-based chemical conversion-treated steel sheet according to claim 16, wherein the zirconium-based chemical conversion treatment liquid is an acid aqueous solution that contains 50 mass ppm to 500 mass ppm of the hexafluorozirconic acid in terms of Zr and has a pH of 3 to 5.

18. The method for producing a zirconium-based chemical conversion-treated steel sheet according to claim 16, wherein the zirconium-based chemical conversion treatment liquid contains 50 mass ppm to 500 mass ppm of the hexafluorozirconic acid in terms of Zr, 5 mass ppm to 50 mass ppm of free fluorine, and 30 mass ppm to 300 mass ppm of the aluminum nitrate in terms of Al.

* * * * *